UNITED STATES PATENT OFFICE.

WILLIAM B. ALLBRIGHT, OF BOSTON, MASSACHUSETTS.

METHOD OF BLEACHING ANIMAL FATS AND OILS.

SPECIFICATION forming part of Letters Patent No. 345,872, dated July 20, 1886.

Application filed March 4, 1886. Serial No. 194,052. (No specimens.)

*To all whom it may concern:*

Be it known that I, WILLIAM B. ALLBRIGHT, of Boston, in the county of Suffolk and State of Massachusetts, a citizen of the United States, have invented a new and useful Improvement in the Method of Bleaching Animal Fats and Oils, of which the following is a full, clear, and exact description.

In practicing my invention I take a given quantity of fat or oil at normal temperature, or very slightly heated, which is placed in a suitable tank or vessel, and add to it from four to six parts, by weight, of fuller's-earth, which is first finely pulverized. This earth is intimately mixed with the fat or oil in the vessel or tank by mechanical agitation, the mixing process being continued for a reasonable time, according to the quantity treated and the nature of the oil or fat. For ordinary purposes I have found that an hour is generally sufficient. The product is then allowed to stand, and the fuller's-earth settles to the bottom. This generally requires about two hours; but of course it varies according to the conditions of the mixture, and a greater or less time may be employed for this purpose. This will leave a clear or bleached product, which is then drawn off from the tank. The residuum is then pumped into a filter, (and I prefer the Johnson filter,) and is submitted therein to air-pressure, by which a portion of the fat or oil held by the earth is extracted. After this the residuum is further treated to live steam under a pressure of from twenty to thirty pounds to the square inch, and the remainder of the oil extracted from the earth.

One of the essential features of this method of bleaching fats and oils is, that it is done without heating the fat or oil to a temperature which shall impart to the product of the process a rank flavor, or a flavor taken from the bleaching clay or earth used. Heretofore it has been customary in bleaching fats and oils to first heat the fat or oil to a temperature exceeding 200° before the bleaching-earth is applied. I have ascertained that the rank or clayey flavor of the bleached oils and fats is due almost entirely to this fact and to the treatment of the fat or oil, while thus heated, with the bleaching powder or earth, the result being that the bleached fat or oil has a rank or clayey flavor. I have further ascertained that it is possible to bleach the fats or oils without first heating them to this temperature, and that the product obtained by the treatment at a comparatively low temperature is much superior to that obtained by the hot treatment, both in flavor and color. Of course, it is not necessary, in practicing the invention, that the fat or oil be treated at a merely normal temperature—that is, the temperature of the room in which the process is practiced—as it is possible to slightly warm or heat fats or oils and still obtain the desirable results above referred to; but fats or oils should not be heated to a temperature sufficient to cause the rank or clayey flavor above mentioned. The oil filtered by air-pressure is of a quality sufficiently good, as a rule, to be mixed with the first product, or the clear oil drawn from the tank.

I would state that I may vary the proportion of fuller's-earth to the oil or fat with which it is used, using more or less than the proportion above given, if desired; also, that I may use as a substitute any equivalent bleaching earth or material. I would say, further, that this process is especially applicable in the bleaching of cotton-seed oil.

I would say that in lieu of allowing the bleaching agent to settle in the tank the fat or oil, immediately after the bleaching agent has been incorporated therewith, may be pumped into the filter and subjected to air and steam pressure, whereby the entire product is filtered. I consider that the action of the bleaching agent upon the oil at a low or comparatively low temperature is different in some respects from what it is when the oil or fats are treated hot, and this difference is very apparent in the improved product.

Having thus fully described my invention, I claim and desire to secure by Letters Patent of the United States—

1. The process of bleaching animal fats and oils at low temperature, consisting in treating the fat or oil at ordinary atmospheric temperature, or at a comparatively low temperature, with pulverized fuller's-earth or other bleaching composition, intimately mixing or mingling the same together by mechanical agitation, then allowing the mixture to stand and the bleaching earth or material to settle, and then removing the clear product from the settling-tank, substantially as set forth.

2. The process of bleaching animal fats or oils, consisting in intimately mixing finely-powdered fuller's-earth or other bleaching material therewith at a comparatively low temperature, then allowing the mixture to stand and the bleaching earth or material to settle, then drawing the fat or oil from the settling vessel or tank, and filtering the residuum by first submitting it in suitable filters to air-pressure, and then to the pressure of live steam at boiler-pressure, all substantially as described.

3. In the process of bleaching animal fats or oils, the treatment of the fat or oil at ordinary atmospheric temperature, or a comparatively low temperature, with pulverized fuller's-earth or other bleaching agent, substantially as described.

WILLIAM B. ALLBRIGHT.

Witnesses:
F. F. RAYMOND, 2d,
J. M. DOLAN.